Aug. 27, 1935.  H. HUEBER ET AL  2,012,819
SUCTION PUMP
Filed March 9, 1932   2 Sheets-Sheet 1
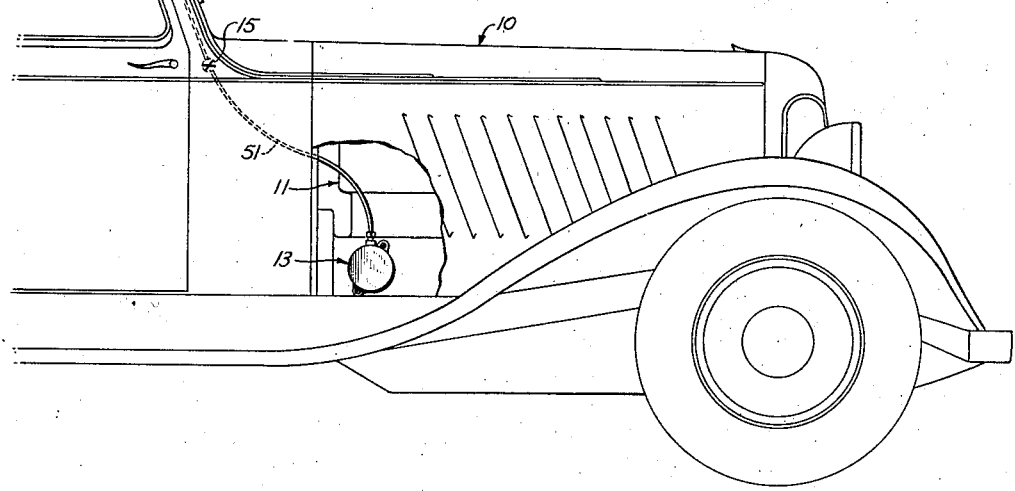
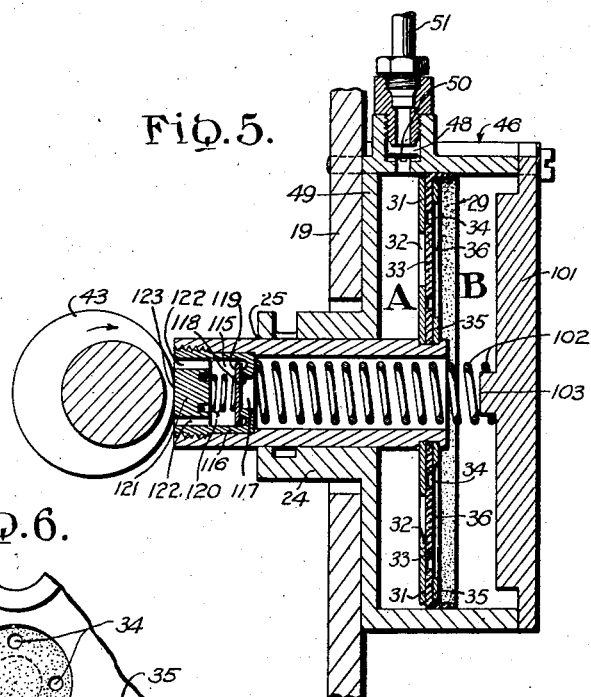
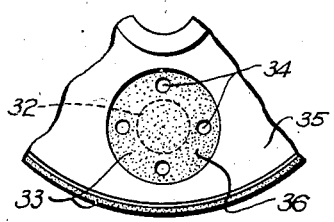
INVENTORS
Henry Hueber,
Erwin C. Horton.
BY
Bean & Brooks, ATTORNEYS

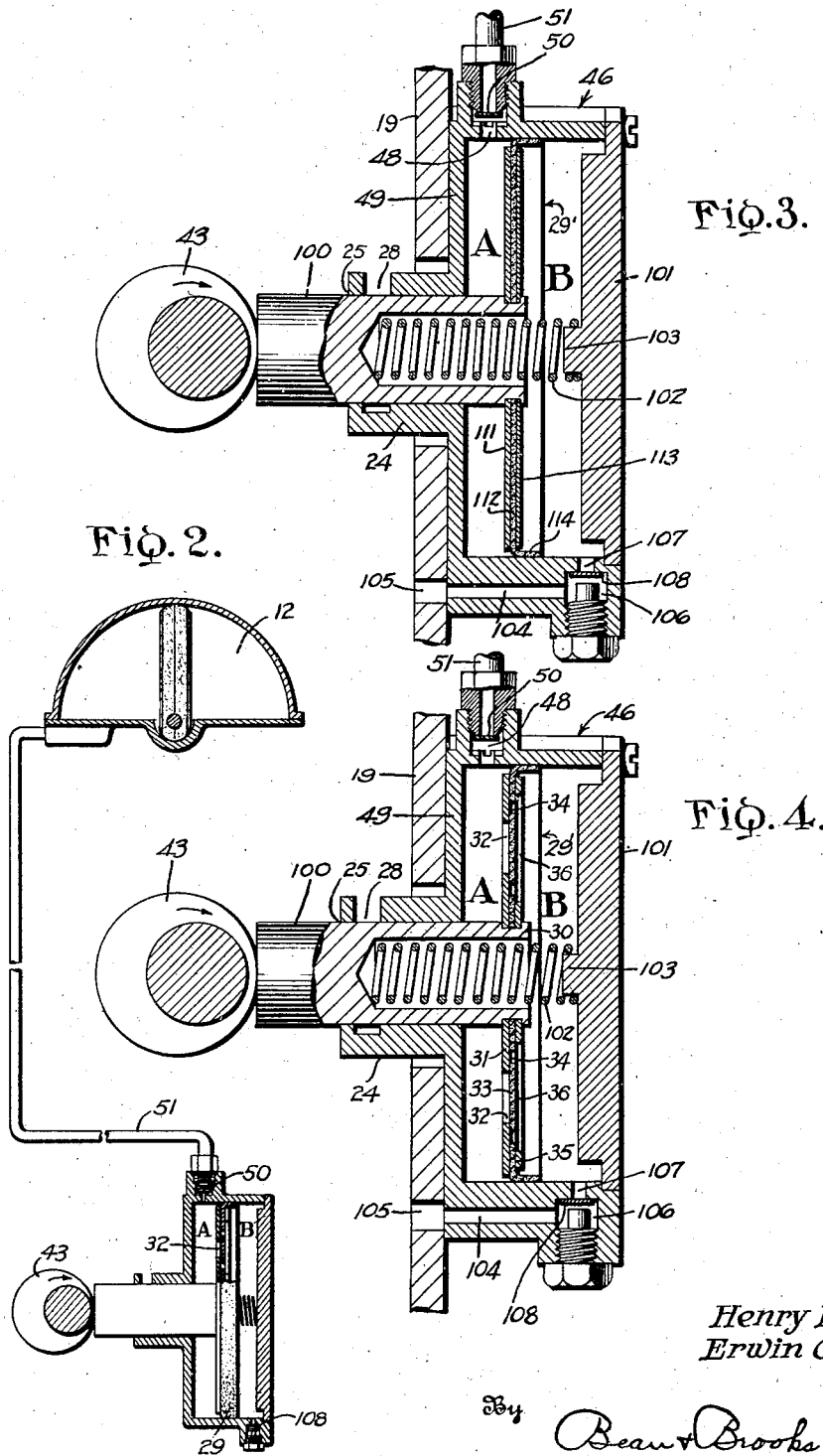

Patented Aug. 27, 1935

2,012,819

UNITED STATES PATENT OFFICE 2,012,819

SUCTION PUMP

Henry Hueber, Buffalo, and Erwin C. Horton, Hamburg, N. Y., assignors to Trico Products Corporation, Buffalo, N. Y.

Application March 9, 1932, Serial No. 597,866

6 Claims. (Cl. 230—33)

This invention relates to a method of and apparatus for operating fluid operated accessories for motor vehicles.

The windshield cleaner of motor vehicles, as an example, has in the past been actuated by the suction induced in the intake manifold of the motor vehicle engine. The intake manifold as a source of suction is variable in its influences and the degree of suction is dependent largely upon the position of the engine throttle. Consequently the cleaner is variable in its operation, decreasing in speed as the throttle opening and engine load increase.

The object of the present invention is to provide a system with ample volume of operating pressure for the windshield cleaner for actuating the same independently of the degree of pressure in the intake manifold of the engine.

The invention further has for its object to provide a system in which a sub-atmospheric pressure is intaken from the windshield cleaner into a chamber and then transferred to a second chamber at a lower pressure by the action of fluid displacing means which, in the presence of such low pressures and by reason of the progressive reductions, supplies an ample volume and degree of the required operating pressure so that the windshield cleaner will function in an efficient manner.

In the drawings attached hereto:

Fig. 1 is a fragmentary showing, in side elevation, of an automotive vehicle showing the instant device attached thereto.

Fig. 2 is a diagrammatic view of the system.

Fig. 3 is a vertical section through the device.

Fig. 4 is a vertical section through a variation of the device.

Fig. 5 is another form of the special pump and valving mechanism.

Fig. 6 is a fragmentary view of one form of fluid displacing member employed.

Referring more particularly to the drawings, an automotive vehicle 10 is provided with an internal combustion engine 11 and an automotive accessory of any desired type, as for instance a windshield wiper 12 having piston and casing elements one relatively movable to the other by fluid pressure alternately applied at opposite sides of the piston through an automatic valve mechanism generally indicated at 12'. The low pressure side of the cleaner is connected to a source of suction 13 by means of a conduit 51 having a hand controlled valve 15.

In proceeding in accordance with the present invention, and referring particularly to Fig. 2 there is provided an initial or inlet suction chamber A having communication through the conduit 51 with the motor chamber 12 of the windshield cleaner. The conduit 51 communicates with the initial suction chamber A through an inlet port having a valve 50 opening toward the chamber A. The chamber is provided with a movable wall 29 which may be either a sliding or diaphragm type of piston and when moved to the right by means of a suitable drive indicated at 43, will enlarge the chamber A so as to induce a movement of the air column 51 from the windshield cleaner into said chamber. On the reverse movement of the wall 29 the chamber A is ensmalled and the fluid therein is trapped against backward movement into the conduit 51, other means of escape being provided for the fluid, such as the port 32. This port is preferably provided in the movable wall 29, and serves to transfer the fluid, upon chamber ensmallment from the chamber A into the outlet chamber B, the latter constituting a secondary suction chamber. This chamber is provided with an outlet to the atmosphere and has an inwardly seating valve 108 preventing retrograde flow of fluid from the atmosphere back into the chamber.

A simplified construction permits the movable wall to serve as a common wall for both the chambers A and B and therefore as the wall moves to ensmall the chamber A it will simultaneously enlarge the chamber B, and vice versa. Upon movement of the wall to ensmall the chamber B, the port will be closed to trap any fluid in said chamber B in advance of the moving wall and compress the same sufficiently to unseat the outlet valve so that a more or less evacuation of the fluid content in said chamber B may be had. Upon reverse movement of the wall or a movement tending to enlarge the chamber B, the outlet valve 108 will seat and consequently effect a rarefaction of the fluid in said chamber to a degree less than atmospheric pressure but greater than that of the fluid in the chamber A which is now under relative compression so that the port will be opened to again permit flow of fluid from chamber A to chamber B. The pressure in chamber A during this stroke will obviously be less than atmospheric pressure since the pressure in the conduit 51 is much less than atmospheric at the time the valve 50 is seated by the pressure differential, and the fluid in said chamber will by-pass the movable wall by reason of the rarefaction and low pressure existing in the chamber B. To insure this rarefaction the movable wall will substantially evacuate such chamber fully by the time it reaches the end of its stroke for ensmalling the chamber.

Such induced movement of the fluid from the windshield cleaner through successive stages, insures a source of very low pressure having substantial uniformity, and by reason of the transfer of fluid from chamber A to chamber B in an atmosphere which is materially below the outside atmosphere the pump is maintained in a cool condition regardless of the high speed of operation under which the same is functioning.

The pump 13 is desirably attached to the crank case 19 of the engine in operative contact with the cam shaft 43, or other eccentric portion of the engine, as a drive for the pump.

The pump proper provides a pump housing 46 having an inlet port 48 which is in fluid communication, by means of conduit 51, with the differential motor of the windshield wiper 12. The opening or port 48 is provided with valving means 50 which permits of unidirectional flow of fluid therethrough into the pump housing, but which prevents flow of fluid in the other direction. The port 48 is positioned adjacent the back plate 49 of the pump housing, which is mounted preferably on the side of the crank case.

An outlet port 107 is positioned in the pump housing adjacent the face plate 101 thereof and has fluid communication with the interior of the crank case by means of the port 105, in the crank case housing, and the passageway 104 of the pump casing. Valving means 108 regulates and controls the outlet passage of fluid from the cylinder but prevents return flow of fluid into the pump housing.

The back plate 49 of the pump housing is provided with an extension 24 having an aperture 25 therein which provides a bearing surface for a pusher rod or shaft 100 which extends into the crank case and has contacting engagement with a drive, such as the cam shaft 43 of the automotive vehicle engine 11.

The extension 24 is provided with a well portion 28, open at the upper end and in fluid communication with the interior of the crank casing whereby the lubricant contained within the crank case may, when splashed upon the crank case wall, flow into and be retained within the well. This construction serves desirably as a reservoir for lubricating fluid which will be carried along the bearing surface of the extension 24 and the piston rod 100 and find its way into the pump housing 46 to be desirably returned to the crank case through the port 107 and passage 104. This fluid acts as a desirable lubricant to keep the piston in pump housing soft and pliable.

The fluid displacing member 29' of the device is in the form of a movable wall which is operatively secured to the forward end of the pusher rod or shaft 100.

The piston 29' is a composite one having a cup packing 112 of flexible material, with a peripheral flange 114 extending in loose bearing contact with the side walls of the piston chamber. A back plate 111 and a face plate 113 are provided as sustaining means for the flexible packing.

To provide a loosely packed piston, these plates 111 and 113 terminate short of the inner walls of the cylinder provided within the housing so that when the piston is moved in the forward direction under the urge of the drive member 43 a tight packing action is secured and fluid is expelled through port 107 and passageway 104 into the crank case of the engine. Upon the movement of the piston in the opposite direction a loose packing action is obtained and fluid is permitted to pass by the flexible piston to the forward side thereof and into the chamber B, defined by face or head plate 101 and piston 110, and in addition, since the valving means 108 closes the port 106, a rarefaction of gaseous material contained in said chamber occurs whereby a cooling action is obtained and the temperature of the housing kept low.

In order to move the piston on its return stroke and to insure continuous contact of the push rod 100 with the cam shaft 43 resilient means 102 are provided which have bearing contact at one end upon a convenient portion of the housing, being located by the centering knob 103, and at the other end upon the piston assembly whereby the resilient member is retained in position and prevented from inadvertent displacement from such bearing contact.

In the operation of this device the forward motion of the piston under the influence of the drive 43 expels fluid from the pump housing, while movement of the piston in the opposite direction under the influence of the resilient means 102 produces pressure in chamber A between the piston and the back plate 49 of the housing, the valving means 50 closing to prevent return of fluid therefrom into the connecting conduit 51. Under the influence of this increased pressure, which is less than atmospheric but greater than that in the conduit 51 as well as that in chamber B, fluid passes from chamber A to chamber B, since rarefaction is being produced in the latter chamber. Consequently, there is a pressure differential in which the two pressures at opposite sides of the piston are much less than atmospheric pressure and fluid is therefore caused to pass between the flexible member 112 and the side walls of the cylinder. As an example, it has been found that upon the forward stroke of the piston a vacuum of 21 inches of mercury was produced at moderate speeds. Upon the back stroke the vacuum decreased to 11 inches while rarefaction occurred between the piston and face plate and generated a vacuum of 13 inches as the maximum at this speed at the end of the stroke.

It is thus clearly seen that this pump provides in its operation a method of cooling the pump especially at high speed, since the passage of fluid by the piston expands from a position of high pressure to a region of low pressure and since the process of rarefaction is also a cooling effect. The pump also provides a mechanism wherein controlled passage of fluid from one side of the pump piston to the other is effected readily and easily by the provision of a simple mechanism which can be economically produced and assembled and which contains a minimum of delicate parts.

In the modified by-passing piston 29 shown in Fig. 4, a back plate 31 is provided which has apertures 32 formed therein. A flexible composition or cup packing 33 is also provided and is placed adjacent to the plate 32 in such fashion as to produce a cup cylinder or piston. Apertures 34 are formed in this flexible packing so that when it is placed in assembled relation with the back plate the apertures are in staggered relation to the apertures 32 formed in back plate 31. A forward securing plate 35 is placed upon the fabric 33 and the three plates 31, 33 and 35 are held in tightly assembled relation by means of the flange 30 of the shaft 100. The forward plate 35 is provided with apertures 36 which are substantially concentric with the apertures 32 in the back plate 31. This aperture has sufficient radius to include therein the staggered apertures 34 within the fabric portion 33 of the composition 50.

From the above description of this mechanism it will be clearly seen that upon movement of the piston toward the face or head plate 101 fluid will be drawn into the chamber A through the conduit 51 while fluid will be expelled or urged out of chamber B through the port 107 and passage 104 to the atmosphere. Upon movement of the piston in the opposite direction, valving means 50 will prevent fluid communication between the chamber A and the conduit 51. A certain fluid pressure will be built up in chamber A and a rarefaction occur in chamber B so that fluid under the higher pressure will force the flexible fiber 33 away from the back plate 31 and escape through the staggered apertures 34 and into chamber B for subsequent exhausting upon reversal of the stroke of the piston.

In the modification of the pump shown in Fig. 5 the pump is provided with a housing 46, head plate 101 and composite piston 29 of the type illustrated and described under Fig. 4. A valve port 48 is provided within the pump housing adjacent the back plate 49 thereof and between said plate and the composite piston 29 whereby the conduit 51 may be connected thereto. Valving means 50 are provided in the port 48 to permit of fluid flow from conduit 51 into the pump housing 46 but prevent flow of fluid in the opposite direction.

The pusher rod or shaft 115 in this showing is tubular and is retained within the bearing surface 25 formed in the extension member 24 of the housing.

The rotary movement of the member 43 provides means by which the rod and piston are moved in the forward direction whereby fluid is drawn from the conduit 51 into the pump housing. Resilient means 102 is provided for moving the piston in the opposite direction and for maintaining engaging contact of the pusher rod 115 and the cam member 43. This resilient means 102 has engaging contact with the head plate 101 at one end and with a convenient portion of the assembled piston and pusher rod.

Means are provided whereby fluid may exhaust from the compartment between the piston 29 and the head plate 101 into the crank case of the internal combustion engine. In the modification shown in Fig. 5, this device comprises a cage 116 fitted into the cored portion of the shaft 115 and serving as a bearing surface for one end of the spring 102. The cage has formed therein a port 117 opening through a valve seat 118 and closed by a valve 119. A resilient member 120 backs the valve 119 to tend to retain the valve upon its seat 118. Means are provided between the valve 119 and the end of the pusher rod whereby communication may be had with the interior of the crank case. In the modification illustrated an apertured plug 121 is inserted in the end of the pusher rod having ducts 122 formed therein which provide fluid communication between the crank case and the cored interior of rod 115 and which presents a bearing face 123 for engaging contact with the cam 43.

It will be clearly seen that motion of the piston 29 in the forward direction under influence of the cam 43 unseats valve 50 and causes fluid to move from the conduit and attached accessory into the pump thus creating a pressure drop or suction. Fluid escapes from the pump through the bore of the rod 115 and as pressure is built up in the pump, valving member 119 is unseated and fluid passes through valve port 117, ducts or passages 122 and so into the crank case. The return stroke of the piston is caused by the action of spring 102. On this stroke valves 50 and 119 are seated and gas within the compartment defined by face plate 101 and piston 29 is rarefied and gaseous fluid pressure upon the other side of the piston 29 built up. Such increase of pressure bears upon the flexible piston member 33 through aperture 32 causing a bulging of the member 33 into the aperture 36 of plate 35 and separating members 31 and 33 so that fluid passes through the apertures 34 in the flexible member 33 and to the face of the pump thus completing the cycle.

What is claimed is:

1. In a fluid pump adapted to be actuated by a rotatable cam in the crank case of an engine, a casing forming a cylinder with a bearing at one end, a tubular member slidably journaled in the bearing and having one end in contact with the cam, said tubular member having a shoulder therein adjacent the end thereof engaged with the cam, a valve normally seating against the outer face of the shoulder to permit fluid passage only from the tubular member into the crank case, a spring disposed in the tubular member engaging one end of the cylinder and the other face of the shoulder to retain the tubular member against the cam, a piston in the cylinder carried by the tubular member, and valve means for admitting fluid to the chamber in the cylinder in communication with the interior of the tubular member.

2. In a fluid pump adapted to be actuated by a cam shaft in the crank case of an engine, a casing forming a cylinder with a bearing at one end, a rod extending through the bearing and having one end in contact with a cam on said cam shaft, a piston in said cylinder secured to the other end of said rod, the piston dividing the cylinder into a pair of chambers, one of said chambers having a valved fluid inlet passage, the rod having a passage therethrough in fluid communication with the crank case and the other of said chambers, and means for passing fluid from the chamber having the inlet passage to the other chamber when the pressure in said other chamber is lower than in the first mentioned chamber.

3. In a fluid pump mounted upon the crank case of an engine having a cam member in said crank case, a casing forming a cylinder with a bearing opening at the inner end thereof, a rod slidably journaled in said bearing and engaging the cam member for reciprocation thereby, a piston in the cylinder carried by the rod and dividing the cylinder into an inlet chamber adjacent the crank case and an outlet chamber remote from the crank case, a valved inlet passage into the inlet chamber and a valved outlet passage from the outlet chamber into the crank case, means for passing fluid to the outlet chamber from the inlet chamber during the presence of relatively higher pressure in the latter chamber, whereby lubricant in the crank case entering said cylinder through said bearing will be discharged through said outlet passage into the crank case.

4. In a suction pump mounted upon the crank case of an engine having a cam member therein, a casing forming a cylinder with a bearing opening at the inner end thereof, a rod slidably journaled in said bearing and engaging the cam member for being operated thereby, a piston on the rod, a check valved inlet port into the cylinder on the side of the piston nearest the crank case, and an outlet port leading from the cylinder into the crank case, whereby lubricant in the crank case entering the cylinder through said bearing will be discharged through said outlet passage into the crank case.

5. A pump for operation from the cam shaft of a motor vehicle engine, said pump comprising a cylinder and a fluid displacing member mounted therein dividing the cylinder into inlet and outlet chambers, said fluid displacing member having a fiber packing in contact with the wall of the cylinder, said cylinder being adapted for mounting on the engine and having a bearing opening from the inlet chamber thereof into the crank case of the engine, an actuator for the piston mounted in the bearing for operation by the engine cam shaft, said cylinder being adapted to receive lubricant through the bearing to serve as a lubricant for the packing, and inlet and outlet ports for the pump, the inlet port opening into the inlet chamber, and the outlet port opening into the outlet chamber and discharging into the engine crank case.

6. In a suction pump mounted upon the crank case of an engine having a cam member therein, a casing forming a cylinder with a bearing opening at the inner end thereof, a rod slidably journaled in said bearing and engaging the cam member for being operated thereby, a piston on the rod, a check valved inlet port into the cylinder on the side of the piston nearest the crank case, and an outlet port leading from the cylinder into the crank case, said outlet port opening being disposed at the lower side of the casing, whereby lubricant in the crank case entering the cylinder through said bearing will be discharged through said outlet passage into the crank case.

HENRY HUEBER.
ERWIN C. HORTON.